(12) United States Patent
Pratt et al.

(10) Patent No.: US 9,013,533 B2
(45) Date of Patent: *Apr. 21, 2015

(54) VIDEO SHARE MODEL-BASED VIDEO FIXING

(71) Applicant: AT&T Intellectual Property II, LP, Atlanta, GA (US)

(72) Inventors: James Pratt, Round Rock, TX (US); Sarah Everett, Austin, TX (US); Marc Sullivan, Austin, TX (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 89 days.

This patent is subject to a terminal disclaimer.

(21) Appl. No.: 13/762,423

(22) Filed: Feb. 8, 2013

(65) Prior Publication Data

US 2013/0147898 A1 Jun. 13, 2013

Related U.S. Application Data

(63) Continuation of application No. 12/267,696, filed on Nov. 10, 2008, now Pat. No. 8,396,004.

(51) Int. Cl.
| | |
|---|---|
| *H04N 7/14* | (2006.01) |
| *H04N 21/2343* | (2011.01) |
| *H04N 21/414* | (2011.01) |
| *H04N 21/431* | (2011.01) |
| *H04N 21/63* | (2011.01) |
| *G06T 9/00* | (2006.01) |
| *H04N 19/46* | (2014.01) |
| *H04N 19/14* | (2014.01) |
| *H04N 19/40* | (2014.01) |

(52) U.S. Cl.
CPC ....... *H04N 7/147* (2013.01); *H04N 21/234336* (2013.01); *H04N 21/41407* (2013.01); *H04N 21/4312* (2013.01); *H04N 21/4314* (2013.01); *H04N 21/631* (2013.01); *G06T 9/001* (2013.01); *H04N 19/46* (2014.11); *H04N 19/14* (2014.11); *H04N 19/40* (2014.11)

(58) Field of Classification Search
None
See application file for complete search history.

(56) References Cited

U.S. PATENT DOCUMENTS

| | | | |
|---|---|---|---|
| 5,802,220 A | 9/1998 | Black et al. | |
| 5,850,352 A | 12/1998 | Moezzi et al. | |
| 6,266,068 B1 | 7/2001 | Kang et al. | |
| 6,381,345 B1 | 4/2002 | Swain | |
| 7,310,589 B2 * | 12/2007 | Li ................................ | 702/179 |

(Continued)

OTHER PUBLICATIONS

Gu, et al. "Semantic video object segmentation and tracking using mathematical morphology and perspective motion model", IEEE.org (1997) Abstract Only.

(Continued)

*Primary Examiner* — Maria El-Zoobi
(74) *Attorney, Agent, or Firm* — Hartman & Citrin LLC

(57) ABSTRACT

Systems and methods for model-based video fixing are disclosed. A video can be retrieved and analyzed to determine if any portion of the video can be represented by a model. If a portion that can be modeled is identified, a model that approximates the portion can be specified, the portion can be removed from the video, and instructions for modeling the video can be formatted. The video and the instructions can be transmitted to a receiving device, which can synthesize the model and the received video to generate a model-based video. Systems for providing the model-based video fixing are also disclosed.

20 Claims, 9 Drawing Sheets

(56) References Cited

U.S. PATENT DOCUMENTS

| | | | |
|---|---|---|---|
| 7,702,127 B2* | 4/2010 | Mihcak et al. | 382/100 |
| 7,904,814 B2* | 3/2011 | Errico et al. | 715/725 |
| 2002/0075382 A1* | 6/2002 | Cohen | 348/14.01 |
| 2004/0076400 A1* | 4/2004 | Kawate et al. | 386/52 |
| 2007/0269120 A1 | 11/2007 | Thiems | |
| 2008/0204556 A1* | 8/2008 | de Miranda et al. | 348/148 |
| 2008/0207137 A1* | 8/2008 | Maharajh et al. | 455/74 |
| 2008/0303942 A1* | 12/2008 | Chang et al. | 348/468 |
| 2009/0079816 A1 | 3/2009 | Qvarfordt et al. | |
| 2009/0087096 A1* | 4/2009 | Eaton et al. | 382/190 |
| 2009/0097820 A1* | 4/2009 | Furuyama | 386/83 |
| 2009/0177792 A1 | 7/2009 | Guo et al. | |
| 2009/0293095 A1* | 11/2009 | Karaoguz et al. | 725/119 |
| 2010/0008547 A1* | 1/2010 | Yagnik et al. | 382/118 |
| 2014/0139609 A1* | 5/2014 | Lu et al. | 348/14.03 |

OTHER PUBLICATIONS

Zhao et al. "Video Synthesis From Still Images Using 3-D Flow Models", IEEE.org (2008) Abstract Only.

* cited by examiner

VIDEO SHARE MODEL-BASED VIDEO FIXING

CROSS-REFERENCE TO RELATED APPLICATIONS

This application is a continuation of U.S. patent application Ser. No. 12/267,696, filed Nov. 10, 2008, now U.S. Pat. No. 8,396,004.

TECHNICAL FIELD

The present disclosure relates generally to communications networks and, more particularly, to systems and methods for providing model-based video fixing for video share on mobile devices.

BACKGROUND

Video sharing is a service that allows users engaged in a voice call to add a unidirectional video streaming session to their connection. Typically, any party to the voice call can initiate a video streaming session. Multiple video streaming sessions can be initiated during a voice call. The shared video can be a live video captured by a camera, e.g., on-board video camera at the device, or a video clip saved on the device.

Typically, video share is initiated from within a voice call. During an established voice call, a party can start a video sharing session. The sending user then streams unidirectional live or recorded video. Both the transmitting party and the receiving party can typically see what is being streamed on their respective devices. Some video sharing services allow a transmitting party to "narrate" over the voice call audio connection while both parties view the video. Usually, either user can terminate a video session at any time.

Video share is often referred to as a combinational service, i.e., a service that combines a voice call, e.g., over a circuit switched network, with a packet switch multimedia session, e.g., over a packet data network. The video sharing service can occur over a 3GPP compliant IMS network as well as over UMTS and EDGE networks. It is generally not supported in a GPRS or a CDMA network. The video sharing client will often drop a video sharing session when the handset transitions from UMTS to GSM during the session, though the voice call over the circuit switched network will often remain connected.

SUMMARY

The present disclosure includes methods and systems that allow substantially simultaneous two-way video sharing over a wireless network. Network resources can be conserved by performing model-based video fixing at devices sharing video with one another. Devices can perform model-based video fixing of captured video, format instructions, and transmit instructions for synthesizing the model-based video from video data, instructions, and models specified by the instructions, to a device with which the video is shared. The transmitting device can receive, substantially simultaneously, video data and instructions from another entity. The transmitting device can synthesize video data and models specified by received instructions to generate a model-based video. Since large portions of the video can be modeled and reconstructed at a receiving device, the network can be relieved from transferring large amounts of video data between devices. This can enable devices to share video between one another in a substantially simultaneous manner.

The devices used to perform two-way model-based video fixing can include one or more processors and one or more memory devices. The processors can be configured to perform highly complex calculations at high speeds. As such, video can be captured, analyzed, modified, and transmitted in real time, near real time, and/or stored for later use.

Accordingly, an embodiment of the present disclosure is directed to a device for performing model-based video fixing for video sharing over a wireless communication network. The device includes a processor and a memory in communication with the processor. The memory is configured to store instructions that are executable by a processor to retrieve video data; analyze the video data to determine if a portion of the video data can be modeled; recognize a portion of the video data that can be modeled; determine a model that can be used to represent the portion of the video data that can be modeled; extract the portion of the video data that can be modeled from the video data; format instructions identifying the portion of the data that can be modeled and the model that can be used to represent the portion of the video data that can be modeled; and transmit the video data and the instructions to a receiving entity. The device can also include a camera, with which the video data can be captured.

In some embodiments, the video data can be converted from a first format to a second format. In some embodiments, the instructions can further include instructions that are executable by the processor to compress the video data and transmit the compressed video data without using a model and without formatting instructions if it is determined that there is no model that approximates the portion to be modeled, wherein compressing video includes converting video data from a first format to a second format.

In some embodiments, the instructions can further include instructions that are executable by the processor to retrieve a model specified in instructions received from an entity sharing video with the device, and synthesize, using the instructions received from the entity, the received video data and the model specified in the instructions, to generate a model-based video. The instructions can further include instructions that are executable by the processor to display the model-based video on a display of the device.

In some embodiments, the instructions can further include instructions executable by the processor to decompress the video data, wherein decompressing the video data includes converting the video data from a second video data format to a third video data format. In some embodiments, the model includes a model stored in a storage device associated with the device, and in some embodiments, the model includes a model that is not stored in a storage device associated with the device. The storage device associated with the device can be a memory of the device, a storage device located on the communications network, a web server, a database, and the like.

Another embodiment of the present disclosure is directed to a method for allowing two-way video sharing over a wireless communication network by performing model-based video fixing. The method can include retrieving video data from a first wireless device in communication with the wireless communication network; analyzing, at the first wireless device, the video data to determine if there is a portion of the video data that can be modeled; recognizing a portion of the video data that can be modeled; determining, at the first wireless device, a model that can be used to represent the portion of the video data that can be modeled; extracting, at the first wireless device, the portion of the video data that can modeled from the video data; formatting instructions identifying the portion of the data that can be modeled and the model that can be used to represent the portion of the video data that can be modeled; and transmitting the video data and the instructions to a second wireless device in communication with the wireless communication network.

In some embodiments, the retrieving video data from the first wireless device can include capturing video data generated by a camera of the first wireless device. In some embodiments, the first wireless device can receive video data and instructions from a second wireless device. The first wireless device can retrieve a model identified in the instructions received from the second wireless device. The model can be retrieved from a local or external storage device including a local memory, a web server, a node on the communications network, and the like.

In some embodiments, the first wireless device can synthesize the model and the received video data to generate a model-based video. The first wireless device can display the model based video on a display associated with the first wireless device.

Another embodiment of the present disclosure is directed to a computer readable medium. The computer readable medium is a tangible storage device that can be used to store computer readable instructions that can be executed by a processing device such as a processor of a computer or wireless device. The instructions, when executed, can perform the steps of retrieving video data from a video data source; analyzing the video data to determine if a portion of the video data can be modeled; recognizing a portion of the video data that can be modeled; determining a model that can be used to represent the portion of the video data that can be modeled; extracting the portion of the video data that can be modeled from the video data; formatting instructions identifying the portion of the data that can be modeled and the model that can be used to represent the portion of the video data that can be modeled; and transmitting the video data and the instructions to a receiving entity.

In some embodiments, the instructions can further include instructions that, when executed, cause a processor to perform the steps of retrieving a model specified in instructions received from an entity sharing video; and synthesizing, using the instructions received from the entity sharing video, the received video data and a model specified in the instructions, to generate a model-based video. The instructions can also include instructions that, when executed by a processor, perform the step of displaying the model-based video on a display. Displaying the model-based video can be accomplished by passing instructions to a video output of a device.

DETAILED DESCRIPTION

As required, detailed embodiments of the present disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

Figure 1:
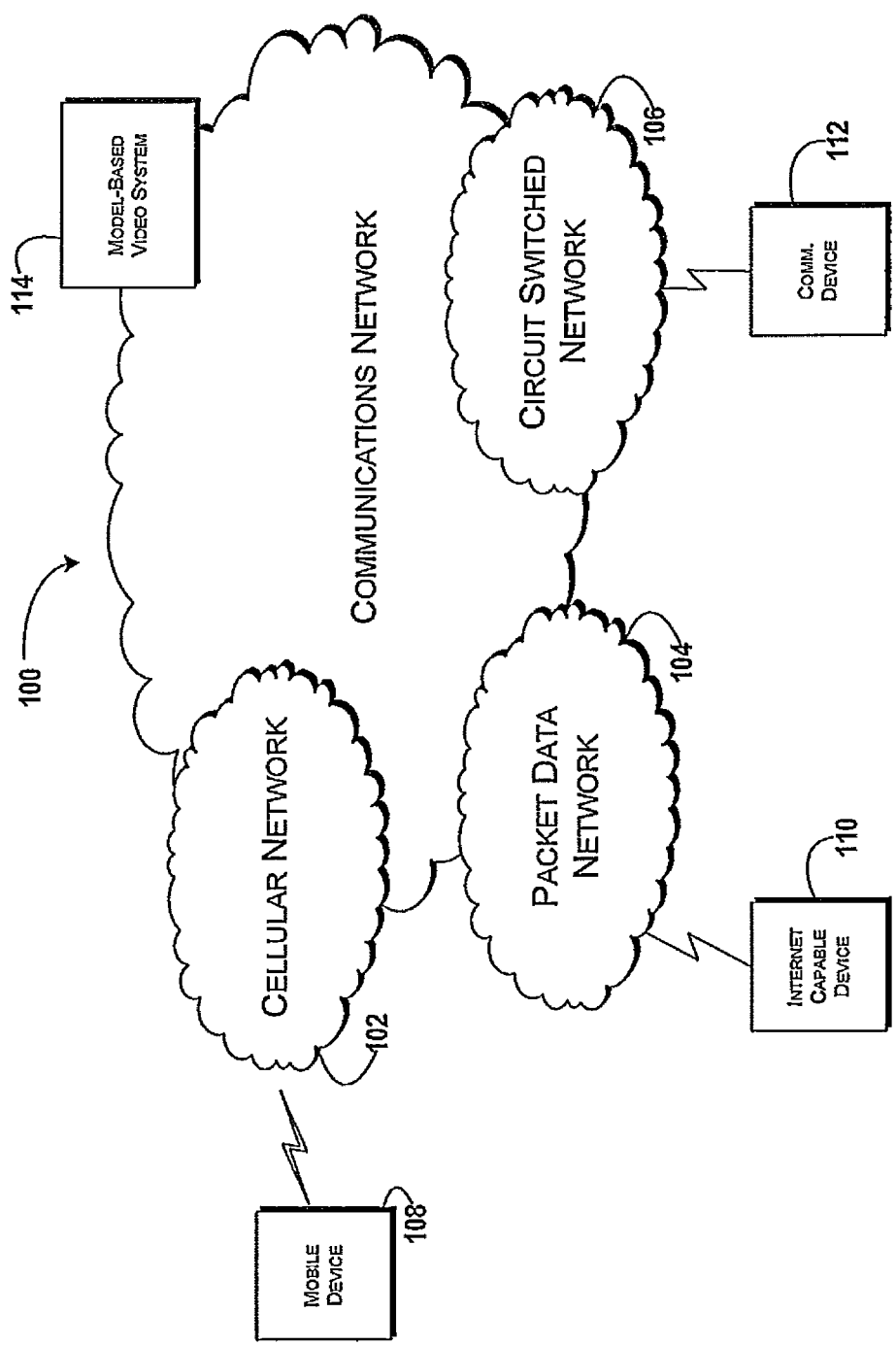
FIG. 1 schematically illustrates an exemplary communications network with which embodiments of the present disclosure can be implemented.

Referring now to the drawings in which like numerals represent like elements throughout the several views, FIG. 1 schematically illustrates an exemplary communications network 100. The illustrated exemplary network 100 includes a cellular network 102, a packet data network 104, for example, the Internet (Internet), and a circuit switched network 106, for example, a publicly switched telephone network (PSTN). The cellular network 102 can include various components such as, but not limited to, base transceiver stations (BTS's), Node-B's, base station controllers (BSC's), radio network controllers (RNC's), mobile switching centers (MSC's), short message service centers (SMSC's), multimedia messaging service centers (MMSC's), home location registers (HLR's), visitor location registers (VLR's), charging platforms, billing platforms, voicemail platforms, GPRS core network components, location service nodes, Internet protocol multimedia subsystem (IMS), and the like. The cellular network 102 can also include radios and nodes for receiving and transmitting voice, data, and combinations thereof to and from radio transceivers, networks, and the Internet 104. A device 108, such as, for example, a cellular telephone, a user equipment, a mobile terminal, a PDA, a laptop computer, a handheld computer, or a combination thereof, can be operatively connected to the cellular network 102.

The cellular network 102 can be configured as a 2G GSM (Global System for Mobile communications) network, and can provide data communications via GPRS (General Packet Radio Service) and EDGE (Enhanced Data rates for GSM Evolution). Additionally, the cellular network 102 can be configured as a 3G UMTS (Universal Mobile Telecommunications System) network and can provide data communications via the HSPA (High-Speed Packet Access) protocol family, for example, HSDPA (High-Speed Downlink Packet Access), EUL (Enhanced Uplink) or otherwise termed HSUPA (High-Speed Uplink Packet Access), and HSPA+

(Evolved HSPA). The cellular network 102 is also compatible with future mobile communications standards including, but not limited to, pre-4G and 4G, for example.

The illustrated cellular network 102 is shown in communication with the Internet 104 and a PSTN 106, though it should be appreciated that this is not necessarily the case. One or more Internet-capable devices 110, for example, a PC, a laptop, a portable device, a device 108, a smart phone, or any other suitable device, can communicate with one or more cellular networks 102, and devices 108 connected thereto, through the Internet 104. It also should be appreciated that the Internet-capable device 110 can communicate with the Internet 104, through the PSTN 106, the cellular network 102, or a combination thereof. As illustrated, a communications device 112, for example, a telephone, facsimile machine, modem, computer, or the like, can be in communication with the PSTN 106, and therethrough to the Internet 104 and/or the cellular network 102. It should be appreciated that the communications device 112 can be an Internet-capable device, and can be substantially similar to the Internet-capable device 110.

As illustrated, the communications network 100 can include one or more model-based video systems 114 (MBVS's). A MBVS 114 can be hardware, software, and/or a combination thereof. The MBVS 114 can be in communication and/or reside upon the cellular network 102, the Internet 104, the PSTN 106, and/or the device 108. The MBVS 114 can be accessible by and/or through multiple devices and networks, including private networks, which are not illustrated in FIG. 1.

It should be appreciated that substantially all of the functionality described with reference to the communications network 100 can be performed by the cellular network 102 alone, or in combination with other networks, network elements, and the like, including the illustrated networks, and some elements that are not illustrated. While the MBVS 114 is illustrated as being in communication with the communications network 100, it should be understood that the MBVS 114 can reside on the cellular network 102, on the packet data network 104, and/or on a circuit switched network 106. As will be explained in more detail below, the MBVS 114 can also reside on a device such as, for example, the device 108, an Internet capable device 110, and/or a communications device 112. As will be explained in more detail below, multiple devices 108, each equipped with an MBVS 114, can communicate with each other over the cellular network 102, through the communications network 100, and/or over other networks.

Figure 2:
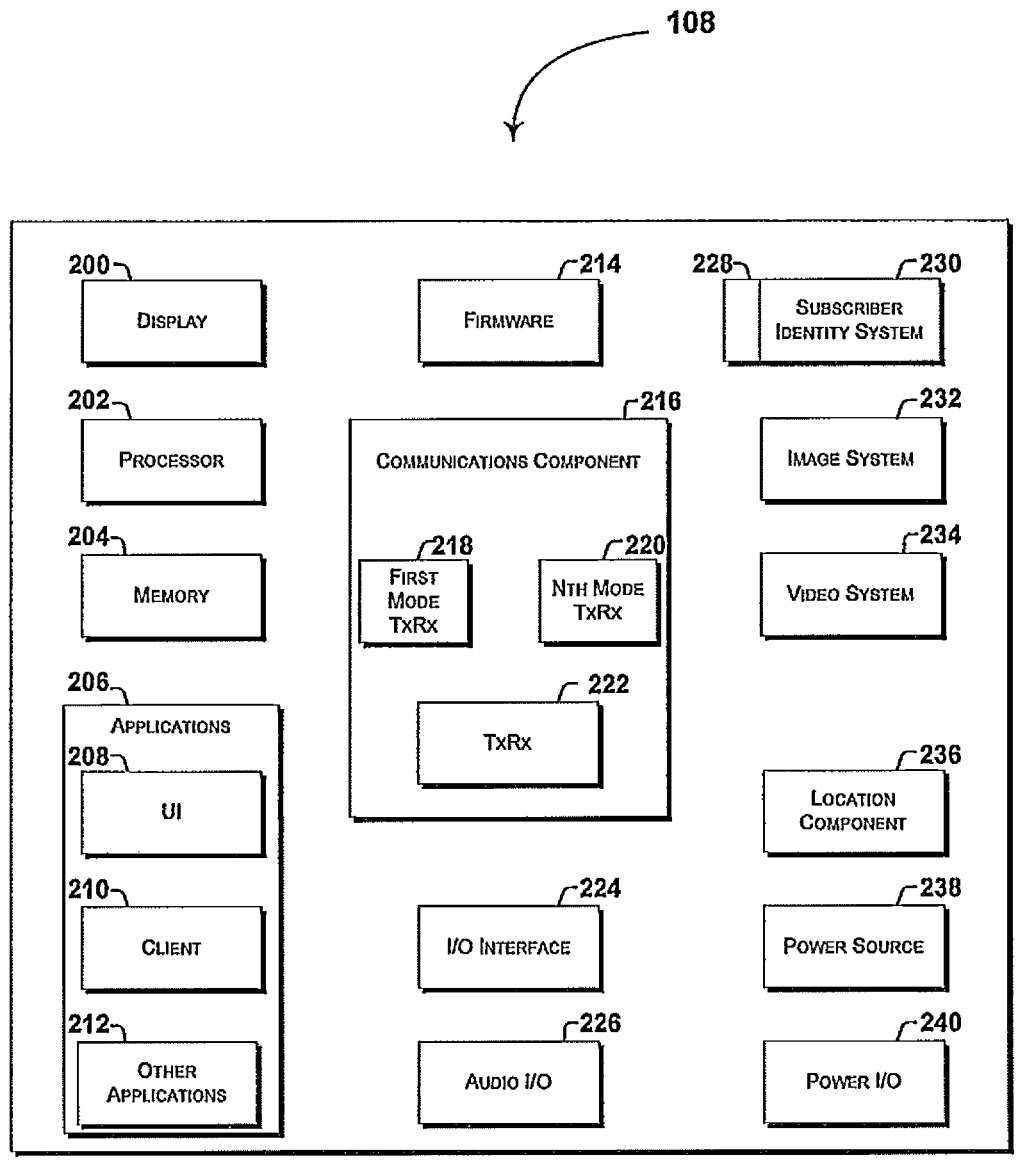
FIG. 2 schematically illustrates a block diagram of an exemplary mobile device for use with exemplary embodiments of the present disclosure.

FIG. 2 illustrates a schematic block diagram of an exemplary device 108 for use in accordance with some exemplary embodiments of the present disclosure. Although no connections are shown between the components illustrated in FIG. 2, the components can interact with each other to carry out device functions.

It should be understood that FIG. 2 and the following description are intended to provide a brief, general description of a suitable environment in which the various aspects of some embodiments of the present disclosure can be implemented. While the description includes a general context of computer-executable instructions, the present disclosure can also be implemented in combination with other program modules and/or as a combination of hardware and software. The term "application," or variants thereof, is used expansively herein to include routines, program modules, programs, data structures, algorithms, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

The device 108 can be a multimode headset, and can include a variety of computer readable media, including volatile media, non-volatile media, removable media, and non-removable media. The term "computer-readable media" and variants thereof, as used in the specification and claims, can include storage media and communication media. Storage media can include volatile and/or non-volatile, removable and/or non-removable media such as, for example, RAM, ROM, EEPROM, flash memory or other memory technology, CD ROM, DVD, or other optical disk storage, magnetic tape, magnetic disk storage or other magnetic storage devices, or any other medium that can be used to store the desired information and that can be accessed by the device 108.

The device 108 can include a display 200 for displaying multimedia such as, for example, text, images, video, telephony functions such as Caller ID data, setup functions, menus, music, metadata, messages, wallpaper, graphics, Internet content, device status, preferences settings, map and location data, and the like. The device 108 can include a processor 202 for controlling, and/or processing data. A memory 204 can interface with the processor 202 for the storage of data and/or applications 206.

An applications 206 can include, for example, video analysis software, video compression software, video and/or image region recognition software, web browsing software, mapping software, video player software, voicemail software, file format conversion software, archival software, audio playback software, music player software, email software, messaging software, combinations thereof, and the like. The applications 206 can also include a user interface (UI) application 208. The UI application 208 can interface with a client 210 (e.g., an operating system) to facilitate user interaction with device functionality and data, for example, answering/initiating calls, entering/deleting data, password systems, configuring settings, address book manipulation, multimode interaction, and the like. The applications 206 can include other applications 212 such as, for example, a model-based video fixing application, video analysis applications, video compression applications, firmware, visual voicemail software, add-ons, plug-ins, voice recognition, call voice processing, voice recording, messaging, e-mail processing, video processing, image processing, video file archival applications, converting, and forwarding, music play, combinations thereof, and the like, as well as subsystems and/or components. The applications 206 can be stored in the memory 204 and/or in a firmware 214, and can be executed by the processor 202. The firmware 214 can also store code for execution during initialization of the device 108.

A communications component 216 can interface with the processor 202 to facilitate wired/wireless communications with external systems including, for example, cellular networks, location systems, VoIP networks, local area networks (LAN's), wide area networks (WAN's), metropolitan area networks (MAN's), personal area networks (PAN's), and other networks, which can be implemented using WIFI®, WIMAX™, combinations and/or improvements thereof, and the like. The communications component 216 can also include a multimode communications subsystem for providing cellular communications via different cellular technologies. For example, a first cellular transceiver 218 can operate in one mode, for example, GSM, and an Nth transceiver 220 can operate in a different mode, for example UMTS. While only two transceivers 218, 220 are illustrated, it should be appreciated that a plurality of transceivers can be included. The communications component 216 can also include a transceiver 222 for unlicensed communications using technology such as, for example, WIFI®, WIMAX™, BLUETOOTH®, infrared, IRDA, NFC, RF, and the like. The communications component 216 can also facilitate communications reception from terrestrial radio networks, digital satellite radio networks, Internet-based radio services networks, combinations thereof, and the like. The communications component 216 can process data from a network such as, for example, the Internet, a corporate intranet, a home broadband network, and the like, via an ISP, DSL provider, or broadband provider.

An input/output (I/O) interface 224 can be provided for input/output of data and/or signals. The I/O interface 224 can be a hardwire connection, such as, for example, a USB, mini-USB, audio jack, PS2, IEEE 1394, serial, parallel, Ethernet (RJ48), RJ11, and the like, and can accept other I/O devices such as, for example, keyboards, keypads, mice, interface tethers, stylus pens, printers, thumb drives, touch screens, multi-touch screens, touch pads, trackballs, joy sticks, microphones, remote control devices, monitors, displays, liquid crystal displays (LCD's), combinations thereof, and the like. It should be appreciated that the I/O interface 224 can be used for communications between the device and a network or local device, instead of, or in addition to, the communications component 216.

Audio capabilities can be provided by an audio I/O component 226 that can include a speaker for the output of audio signals and a microphone to collect audio signals. The device 108 can include a slot interface 228 for accommodating a subscriber identity system 230 such as, for example, a SIM or universal SIM (USIM). The subscriber identity system 230 instead can be manufactured into the device 108, thereby obviating the need for a slot interface 228. In some embodiments, the subscriber identity system 230 can store certain features, user characteristics, rules, policies, models, and the like. The subscriber identity system 230 can be programmed by a manufacturer, a retailer, a customer, a network operator, and the like.

The device 108 can include an image capture and processing system 232 (image system). Photos and/or videos can be obtained via an associated image capture subsystem of the image system 232, for example, a camera. The device 108 can also include a video system 234 for capturing, processing, recording, modifying, modeling, and/or transmitting video content. The video system 234 can provide video data to various applications 206, such as, for example, video analysis applications, video compression applications, video sharing applications, and the like.

A location component 236, can be included to send and/or receive signals such as, for example, GPS data, A-GPS data, WIFI®/WIMAX™ and/or cellular network triangulation data, combinations thereof, and the like. The location component 236 can interface with cellular network nodes, telephone lines, satellites, location transmitters and/or beacons, wireless network transmitters and receivers, for example, WIFI® hotspots, radio transmitters, combinations thereof, and the like. The device 108 can obtain, generate, and/or receive data to identify its location, or can transmit data used by other devices to determine the device 108 location. The device 108 can include a power source 238 such as batteries and/or other power subsystem (AC or DC). The power source 238 can interface with an external power system or charging equipment via a power I/O component 240.

Figure 3:
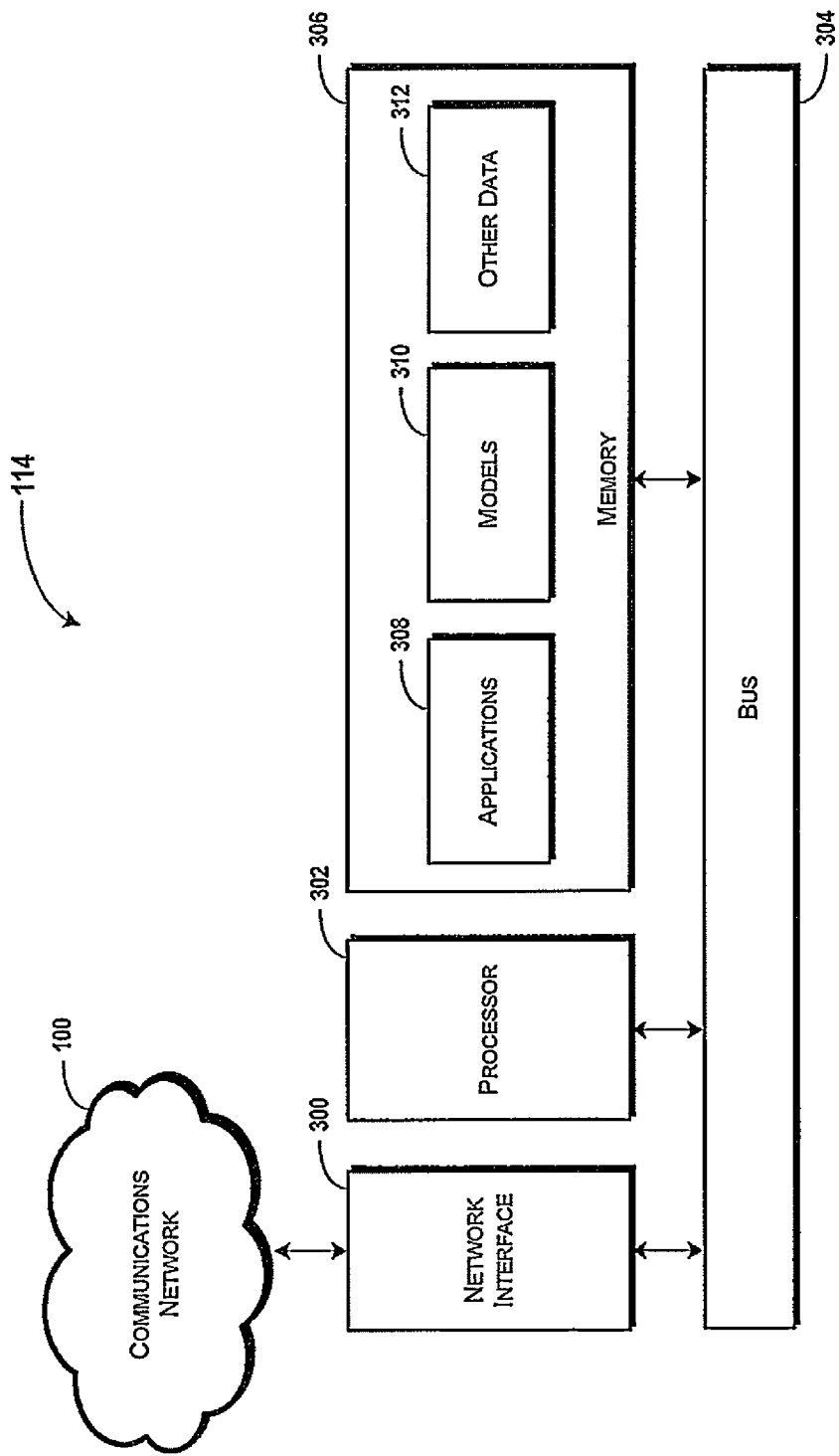
FIG. 3 schematically illustrates a model-based video system, according to an exemplary embodiment of the present disclosure.

FIG. 3 schematically illustrates a block diagram of an MBVS 114 according to an exemplary embodiment of the present disclosure. The MBVS 114 can be a combination of hardware and software, and can exist as a node on a communications network 100, and as a hardware/software module on a device such as the illustrated device 108. The illustrated MBVS 114 includes one or more network interfaces 300 that are operatively linked and in communication with one or more processors 302 via one or more data/memory busses 304. The network interface 300 can be used to allow the MBVS 114 to communicate with one or more components of the communications network 100, or any device connected thereto or residing thereon. The processor 302 is operatively linked and in communication with a memory 306 via the data/memory bus 304.

The word "memory," as used herein to describe the memory 306, collectively includes all memory types associated with the MBVS 114 such as, but not limited to, processor registers, processor cache, random access memory (RAM), other volatile memory forms, and non-volatile, semi-permanent or permanent memory types; for example, tape-based media, optical media, flash media, hard disks, combinations thereof, and the like. While the memory 306 is illustrated as residing proximate the processor 302, it should be understood that the memory 306 can be a remotely accessed storage system, for example, a server on the Internet 104, a remote hard disk drive, a removable storage medium, combinations thereof, and the like. Moreover, the memory 306 is intended to encompass network memory and/or other storage devices in wired or wireless communication with the MBVS 114, which may utilize the network interface 300 to facilitate such communication. Thus, any of the data, applications, and/or software described below can be stored within the memory 306 and/or accessed via network connections to other data processing systems (not shown) that may include a local area network (LAN), a metropolitan area network (MAN), or a wide area network (WAN), for example.

Accordingly, the present disclosure may operate on the MBVS 114, wherein the MBVS 114 is configured as a server to one or more client data processing systems as dictated by a client/server model. It should be appreciated that the memory 306 can also be a storage device associated with the device 108. The illustrated memory 306 can include one or more applications 308, models 310, and/or other data 312.

The applications 308 can include various programs, routines, subroutines, algorithms, software, tools, and the like ("instructions"), for processing, modifying, storing, and sending video. The applications 308 can be used to analyze the video and/or frames of the video, to recognize portions of the video to model. For example, the applications 308 can include applications that recognize faces, bodies, colors, patterns, movements, and the like to identify a portion that can be modeled. The applications 308 can also include instructions for formatting modeling instructions, identifying models, compressing video, audio, and/or images, and transmitting the data to other entities such as, for example, nodes of the communications network 100, other devices, and the like.

The applications 308 can also include instructions used to operate the MBVS 114 and/or devices connected to the MBVS 114, if any. The instructions can include, for example, operating systems, firmware, drivers for peripherals, and the like. The applications 308 can also include, for example, authentication software, billing applications, user interface (UI) applications, usage tracking applications, and the like.

The models 310 can include images, video, shades, colors, patterns, and combinations thereof, for modeling portions of video, or portions of individual frames of video. The models 310 can include, for example, visual representations of sand, beach, grass, water, sky, flowers, mountains, skin, crowds, houses, walls, bricks, and the like. Additionally, the models 310 can include, for example, colors, shades, and patterns. For example, in certain conditions, regions of the sky can be modeled by a solid color. Additionally, or alternatively, a model can be generated for humans, for example, by replacing regions of the face or other parts of the body, with a skin-colored image. The models can also include videos, animations, and other dynamic images or videos. For example, a beach scene can be modeled by a video of a beach, sky, and/or ocean to model waves, beaches, the sky, and the like. Many other models 310 are possible and contemplated, but are not described herein for the sake of clarity.

If the MBVS 114 is a node on the communications network 100, the MBVS 114 can also store device data associated with a user. The device data can include one or more data that identify one or more devices used by the user to connect to the communications network 100, for example, an international mobile subscriber identity (IMSI), an international mobile equipment identity (IMEI), a telephone number, an IP address, an email address, and the like. If a user connects to the MBVS 114, the MBVS 114 can verify, by examining the device data and the data associated with a device currently connected to the MBVS 114, that the user is using a recognized device to connect to the MBVS 114. These and other data can be used by the MBVS 114 to enforce for security, privacy, and billing policies.

The other data 312 can include, for example, billing information, account data, user device data, software, programs, algorithms, hardware data, video and/or audio encoder/decoders (CODEC's) and the like. The other data 312 can also include account/device data that relates to a user's account and/or to one or more devices 108. The account/device data can include, but is not limited to, the user's subscription plan, subscription features, and/or the capabilities of the user's device 108.

For example, the MBVS 114 can be in communication with one or more billing platforms, subscriber databases, other network nodes, and the like, to receive the account/device data relating to a user's subscription plan, usage, and billing information. Additionally, the account/device data can inform the MBVS 114 of the features the user's device 108 supports by indicating one or more of the IMSI or the IMEI, the serial number, a carrier, a software version(s), firmware information, one or more carrier-specific applications, combinations thereof, and the like. As such, the account device data can indicate if the device 108 supports WIFI®, 3G, 2G, EDGE, GPS, A-GPS, network triangulation, BLUETOOTH®, NFC, audio formats, video formats, data transfer of audio files and video files, and the like. Additionally, the account/device data can indicate whether services provided by the device 108 are charged/billed on a pre-paid and/or post-paid basis, or if features are available on the device 108.

The account/device data can pass-through the MBVS 114, or can be stored, at least temporarily. The MBVS 114 can use the account/device data to determine, for example, how to determine location of the device 108, how to enforce policies, and the like. Additionally, billing, privacy, safety, and/or other concerns can be used to tailor functionality of the MBVS 114 through the account/device data. For example, a user can disable the functionality of the MBVS 114 and store a preference indicating disablement of the MBVS 114 as an account setting stored in the account/device data. Additionally, the MBVS 114 can use billing information to adjust functionality of the MBVS 114. For example, a notification can be sent from a billing platform to the MBVS 114 and the MBVS 114 can disable functionality automatically. A user can be given the ability to override deactivation of some, none, or all desired features or functionality.

The other data 312 can also include a billing module (not illustrated) that can be used to track, collect, and/or report activities of the MBVS 114 to a billing system at the MBVS 114, or elsewhere on the communications network 100 for billing purposes. It should be understood that if the MBVS 114 resides on one or more devices, the billing module can be a combination of hardware and software reside elsewhere on the communications network 100.

The billing module can track, for example, how much data is sent and received by the MBVS 114, and can report this information to a billing and/or charging system of the communications network 100, for example. Billing and/or charging can be pre-paid or post-paid. The functionality of the MBVS 114 can be charged on any desired basis, including, but not limited to, a per-use basis, as a flat fee, as part of service package, or the like.

As mentioned above, the other data 312 can also include CODEC's. CODEC's can include algorithms, programs, and/or software that is used by a hardware device or software to compresses or decompresses data, for example, video and audio data. It will be appreciated that the term "CODEC," as used herein and in the claims, refers to any algorithm, program, application, routine, subroutine, and the like, used to compress and/or decompress data. In the illustrated MBVS 114, the CODEC's can be used to convert voice, audio, and/or video data to, from, and/or between various formats. The CODEC's can include algorithms that direct computer programs or hardware devices, for example, how to represent a video or audio file in a manner that uses a minimum amount of data while retaining the original video or audio file quality. The use of the CODEC's can reduce the amount of storage space needed to store the voice data. Similarly, the CODEC's can be used to minimize the bandwidth required to transmit audio files to, from, or through the communications network 100, or a device 108, 110, 112 connected thereto.

Exemplary formats for voice, audio, and video data include, but are not limited to, waveform audio (WAV), audio interchange file format (AIFF), RAW, encoded in GSM CODEC, advanced audio coding (AAC), MPEG-1 audio layer 3 (MP3), MPEG-4 Part 14 (MP4 or M4A), Windows® media audio (WMA), RealAudio® (RA), free lossless audio codec (FLAG), Apple® lossless encoder (ALE), i.e., Apple® lossless audio codec (ALAC), AVI, H.261, MPEG-1 Part 2, MPEG-2 Part 2, H.262, H.263, MPEG-4 Part 2, DivX, Xvid, FFmpeg, MPEG-4, 3ivx, MPEG-4 Part 10 (AVC), H.264, x264, Windows Media Video (WMV), VC-1, RealVideo (RV), and other open and proprietary audio and video formats.

As explained briefly above, the MBVS 114 can reside on one or more mobile devices such as, for example, the device 108. As such, it should be understood that the applications 308, the models 310, and the other data 312 can be stored in a memory 204 of the device 108. Some or all of the applications 308 can be stored as the applications 206 of the device 108. Similarly, the processor 302 can be the processor 202 of the device 108. Additionally, the network interface 300 can be a communications component of the device 108, for example, a short range radio device, a transceiver, a receiver, a transmitter, antennae, or combinations thereof.

In some embodiments, the MBVS 114 resides on the communications network 100. The MBVS 114 can be used to perform the functions of the MBVS 114 described herein to video that has not been modeled. For example, if a device without model-based video fixing capability transmits video to a device operating on the communications network 100, the MBVS 114 can perform the modeling functionality described in more detail below and forward the modified video to the device 108. As such, an MBVS 114 operating on the communications network 100 can reduce the network resources needed to transmit video to the device 108.

Figure 4:
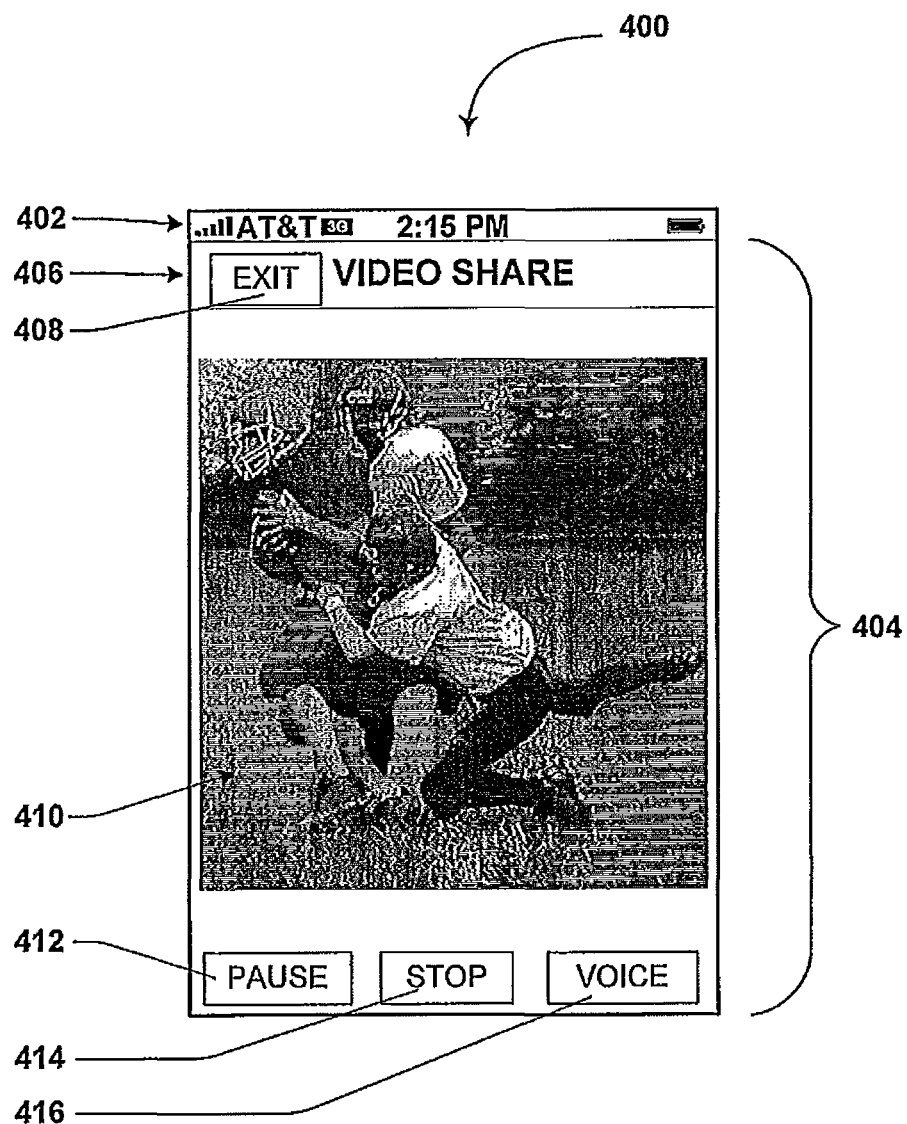
FIG. 4 illustrates a graphical user interface (GUI) for providing an interface with which to control a video sharing application of a mobile device, according to an exemplary embodiment of the present disclosure.

FIG. 4 illustrates an exemplary GUI 400 for a device 108, according to an exemplary embodiment of the disclosure. In some embodiments, the GUI 400 is displayed by a video output source on a display 200 of a device 108. As illustrated, the GUI 400 can include operational information 402 for the device 108. The operational information 402 can include network information, for example, a signal meter for displaying the measured strength of a network signal, and information relating to the network with which the device 108 is in communication. In the illustrated GUI 400, the device 108 is indicating a maximum signal strength and that the device 108 is currently connected to the AT&T 3G (third generation) network. It should be understood that this indication is exemplary only. The GUI 400 can be used on devices operating on other networks, other protocols, and/or operated by other carriers. The operational information 402 can also include, for example, the time of day, a date, a message waiting indicator, a battery meter, a short range radio communications device indicator, an alarm indicator, other information, and the like.

The GUI 400 includes a video sharing interface 404 for interfacing with a user to share video with a designated entity. As will be explained in more detail below, the MBVS 114 can reside on the device 108 or on the communications network 100. The device 108 can interface with the user and the MBVS 114 to provide the functionality of the MBVS 114 described herein. If the MBVS 114 resides on the communications network 100, the device 108 can provide data and/or voice connections, and the device 108 can transmit video, audio, and/or instructions, to the MBVS 114.

The video sharing interface 404 includes a title and menu portion 406 for indicating to a user the function currently being performed by the device 108. The title and menu portion 406 can include options such as, for example, an option 408 to exit the video sharing interface 404. It should be understood that this option is merely exemplary and that other options are possible and contemplated.

The video sharing interface 404 can also include a monitor 410 for displaying the video currently being shared by the device 108, for example. In the exemplary view, the monitor 410 is showing a video of a football game that is being shared with another entity. The monitor 410 can also display transmission information such as, for example, the number of bits or bytes transmitted, the time lapsed since video sharing began, the anticipated or actual delay between the video capture and display for the receiving party, the anticipated cost of the transmitted video, and the like. Additionally, or alternatively, the monitor can display a received video in the event that the device 108 is involved in a two-way video share session. The monitor 410 can provide picture-in-picture (PIP) functionality, which will be described in more detail below with reference to FIG. 7. The PIP can display the video being transmitted, operational information, user applications, and the like.

The video sharing interface 404 can include various options, for example, an option 412 to pause transmission of shared video, an option 414 to stop transmitting shared video, an option 416 to transmit voice, additional and/or alternative options (not illustrated), combinations thereof, and the like. It should be understood that the illustrated options 412, 414, 416 are exemplary only. Additional and/or alternative options are possible and contemplated.

In operation, a video sharing application can be activated at the device 108. The video sharing application can be activated by a user, through selection of an option through an interface, or by the device 108. Initiation of the video sharing application can prompt the device to initiate a video source or video input of the device 108, and can activate an application to capture video from the video input. Additionally, or alternatively, the device 108 can prompt a user, and a user can designate a video file to share.

When a video source, for example, a live video feed, a delayed video feed, or a video clip, is identified by the user, the video source data can be passed to the video sharing application. The video sharing application can include a model-based video fixing application that identifies and models portions of the video. It should be appreciated that the model-based video fixing application can identify and model portions of the video one frame at a time, if desired.

The portions identified for modeling can be modeled, instructions can be formatted, and the modeled video and instructions can be formatted for transmission to a receiving entity. If desired, the video can be compressed and transmitted to the receiving entity for storage and/or display by the receiving entity. Video and/or video frames, can be captured, modeled, compressed, and transmitted real-time, near real-time, or with a delay.

FIGS. 5A-5D illustrate model-based video fixing for an exemplary frame of a video, according to an exemplary embodiment of the present disclosure. An exemplary method for performing the model-based video fixing will be described below in more detail with reference to FIG. 8.

Figure 5A:
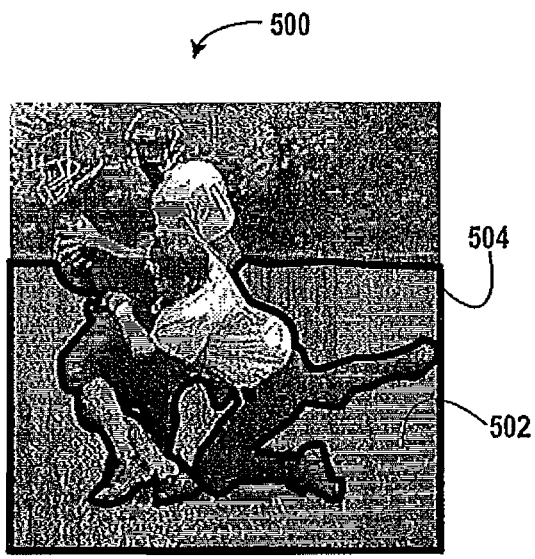
FIGS. 5A-5D illustrate model-based video fixing for an exemplary frame of a video, according to an exemplary embodiment of the present disclosure.

In FIG. 5A, a video frame 500 is illustrated. The video frame 500 includes a scene from a football game. As will be explained in more detail below, the video frame 500 can be analyzed for a portion to be modeled. For example, a model-based video fixing application can analyze the video frame 500. In the illustrated video frame 500, the model-based video fixing application has identified the grass as being a portion of the video that can be modeled. The model-based video fixing application can define the portion as a region bound by coordinates in the video, for example. In the illustrated video frame 500, the model-based video fixing application has identified the region 502 bound by a line 504 as a region of the video frame 500 that can be modeled. It should be appreciated that although the region 502 is illustrated as being defined by a line 504, the model-based video fixing application can identify the region 502 by lines, points, blocks, pixels, coordinates, and the like.

Figure 5B:
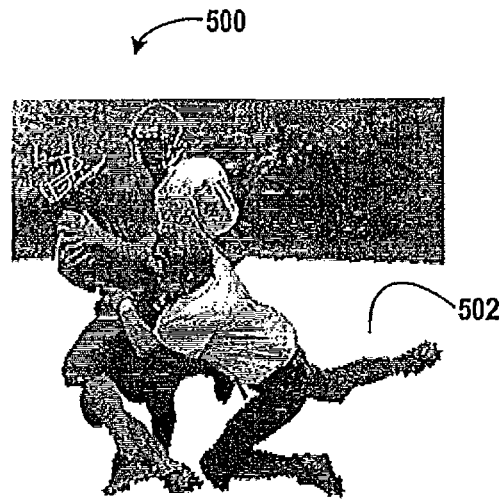
Figure 5C:
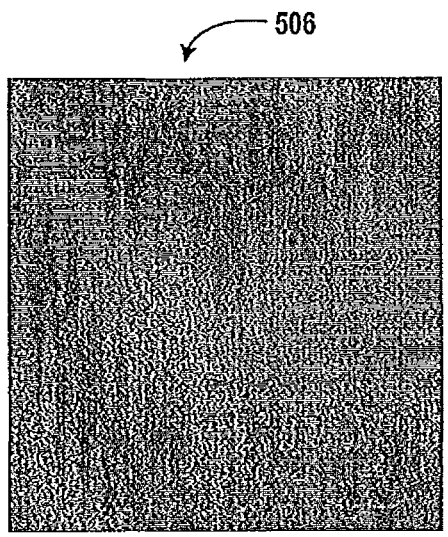

As shown in FIG. 5B, if the model-based video fixing application determines that a model exists for the identified portion, the model-based video fixing application can effectively subtract the region 502, thereby creating a frame 500 with no video information at the region 502. As shown in the exemplary frame 500 of FIG. 5B, the frame 500 can now include only the portions of the video that will not be modeled. As shown in FIG. 5C, the model-based video fixing application can search through available models to identify a model to substitute for the modeled region, for example, an image 506. The model-based video fixing application can identify a model based upon data in the region 502, and data in the image 506. For example, the model-based video fixing application can identify colors, patterns, faces, pattern repetitions, and the like, in the region 502, and can search for substantially similar colors, patterns, faces, pattern repetitions, and the like, in models stored in a model library, or other data storage area. It should be appreciated that the model can be similar, but does not need to be identical. In some embodiments, color and pattern recognition can be used to identify the type of material, for example, grass. The model-based video fixing application can then search for a grass model to use. Other embodiments include restricting color and pattern variations between the region 502 and the image 506 to certain ranges, for example, 5%, 10%, 25%, 50%, and the like. The model-based video fixing application can format instructions identifying the selected model.

Figure 5D:
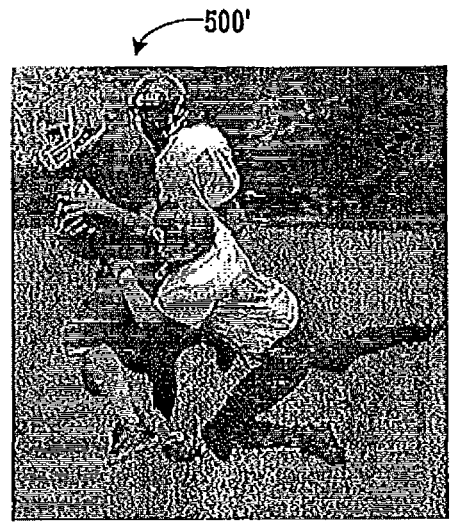

As shown in FIG. 5D, a receiving device can synthesize the transmitted video and an appropriate model based upon transmitted instructions to create a video frame 500'. It will be appreciated that the video frame 500' is substantially similar to the transmitted video frame 500. Furthermore, it should be appreciated that the video frame 500' is not a true representation of the video frame 500. Rather, at least a portion of the video frame 500' is a model-based approximation of the video frame 500.

FIGS. 6A-6D illustrate model-based video fixing for another exemplary frame of a video, according to an exemplary embodiment of the present disclosure. An exemplary method for performing the model-based video fixing will be described below in more detail with reference to FIGS. 8 and 9.

Figure 6A:
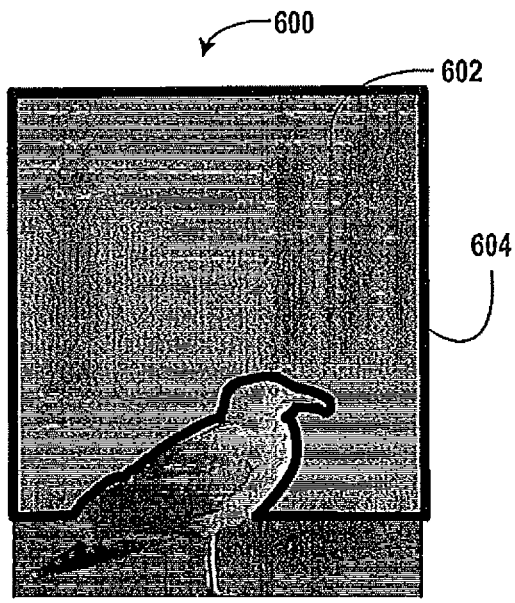
FIGS. 6A-6D illustrate model-based video fixing for another exemplary frame of a video, according to an exemplary embodiment of the present disclosure.

In FIG. 6A, the video frame 600 includes a scene from a beach. As explained above, the video frame 600 can be analyzed for a portion to be modeled by a model-based video fixing application. In the illustrated video frame 600, the model-based video fixing application has identified the sky as being a portion of the video that can be modeled, and has defined the portion 602 bound by the line 604 as a region of the video frame 600 to be modeled. As explained above, the illustrated line 604 is included for purposes of clarifying the disclosed embodiments. It should, therefore, be appreciated the region 602 can be identified by lines, points, blocks, pixels, coordinates, and the like.

Figure 6B:
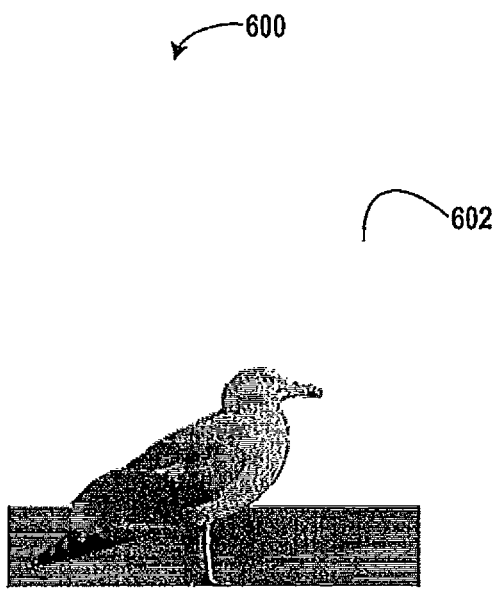

As shown in FIG. 6B, the model-based video fixing application has determined that a model exists for the identified portion, and has removed the region 602 from the video, thereby creating a frame 600 with no video information at the region 602.

Figure 6C:
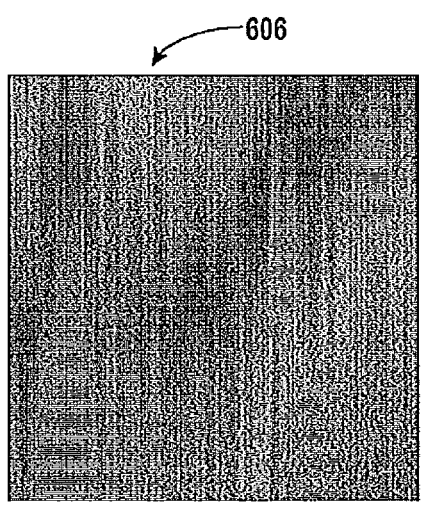

As shown in FIG. 6C, the model-based video fixing application can search through available models to identify a model to substitute for the modeled region 602. In the illustrated embodiment, the model-based video fixing application has determined that the region 602 can be modeled by a solid color, as illustrated by the color sample 606. While the color sample 606 is illustrated as a sample that is roughly the size of the removed region 602, it should be appreciated that the color sample 606 can be identified by a color code, for example, relative weights of red, green, and blue (RGB), relative weights of cyan, magenta, yellow, and key (CMYK), RGB decimal codes, RGB hexadecimal codes, X11 color codes, color names, and the like. Similarly, the color sample 606, can be an image that is one pixel by one pixel in size, and can be repeated to fill the region 602.

The model-based video fixing application can identify colors, color patterns, color pattern repetitions, and the like, in the region 602, and can search for a substantially similar color, color pattern, color pattern repetition, and the like, in models stored in a model library, or other data storage area, as explained in more detail above with reference to FIG. 5C. The model-based video fixing application can format instructions identifying the selected model.

Figure 6D:
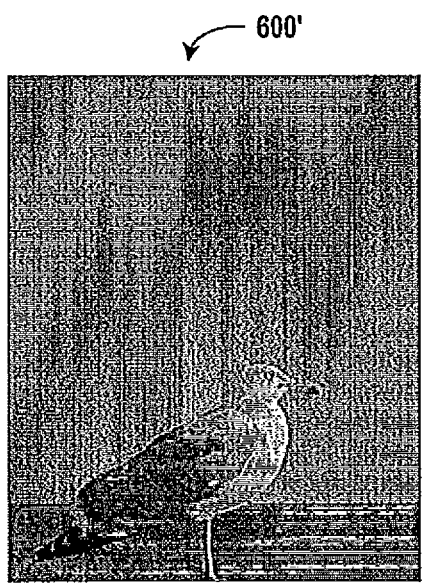

As shown in FIG. 6D, a receiving device can synthesize the transmitted video and an appropriate model based upon transmitted instructions to create a video frame 600'. It will be appreciated that the video frame 600' appears substantially similar to the captured video frame 600, but is not a true representation of the captured video frame 600.

Figure 7:
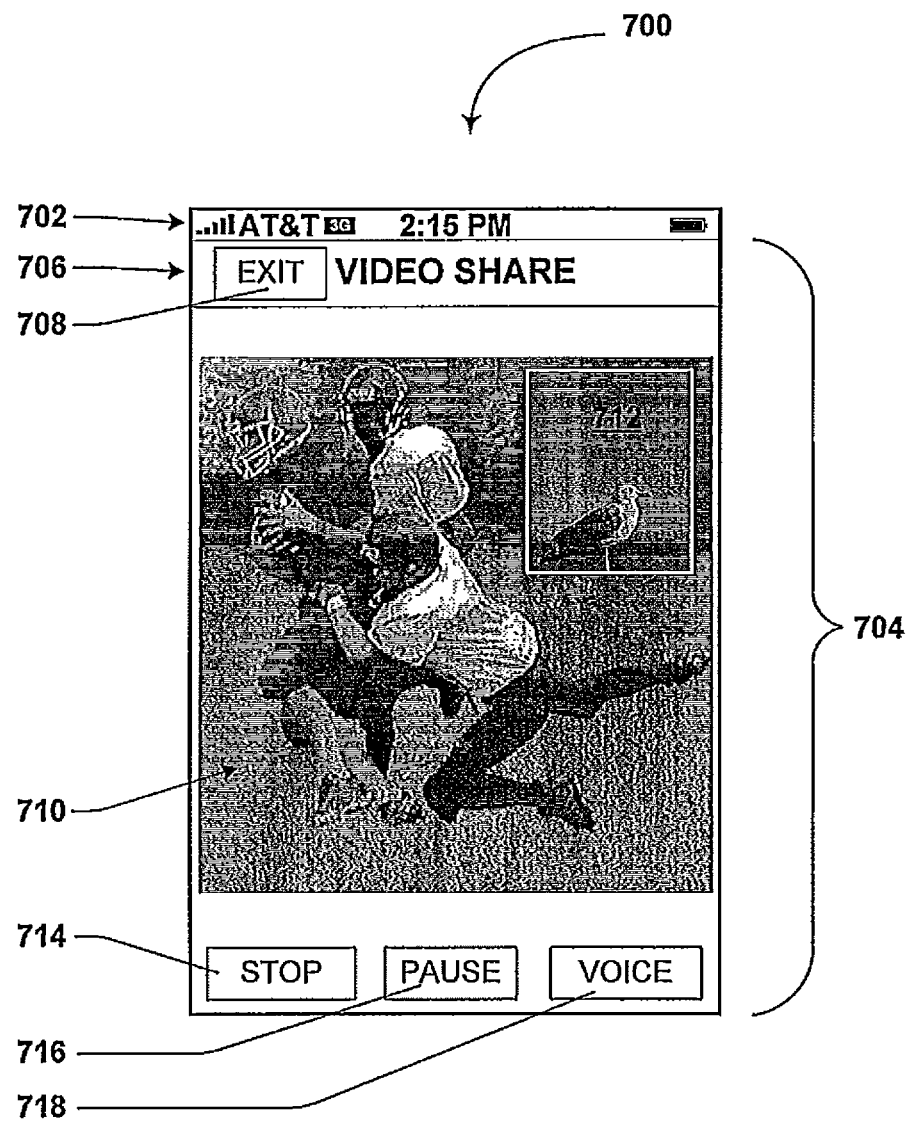
FIG. 7 illustrates a graphical user interface (GUI) for viewing a shared video on a mobile device, according to an exemplary embodiment of the present disclosure.

Referring now to FIG. 7, a GUI 700 for viewing a shared video on a mobile device 108 is illustrated, according to an exemplary embodiment of the present disclosure. In some embodiments, the GUI 700 is displayed by a video output source on a display 200 of a device 108. As illustrated, the GUI 700 can include operational information 702 for the device 108, as explained above with reference to FIG. 4.

The GUI 700 includes a video sharing interface 704 for interfacing with a user to view video shared by another entity transmitting shared video. The video sharing interface 704 includes a title and menu portion 706 for indicating to a user the function currently being performed by the device 108. The title and menu portion 706 can include options such as, for example, an option 708 to exit the video sharing interface 704. It should be understood that this option is merely exemplary and that other options are possible and contemplated.

The video sharing interface 704 can also include a monitor 710 for displaying the video currently being received from a device transmitting video. The device transmitting video can be, for example, another device 108 operating on the communications network 100. In the exemplary view, the receiving device 108 is receiving, and the monitor 710 is displaying, the exemplary frame 500' described above with reference to FIG. 5D, and transmitted by the transmitting device 108. As explained above, the monitor 710 can also display other information such as, for example, data sent, data received, time delays, approximate or exact cost, other information, and the like.

In the illustrated embodiment, the monitor 710 is displaying a picture-in-picture 712 (PIP) of a video being transmitted to the transmitting device 108 during a two-way video sharing session. As such, the user can view the video being shared by the transmitting device 108, and the video the user is sharing with the transmitting device 108. It should be understood that the PIP 712 can display the video being received, the video being transmitted, operational information, user applications, and the like.

The video sharing interface 704 can include various options, for example, an option 716 to pause transmission or reception of shared video, an option 714 to stop transmitting or receiving shared video, an option 718 to transmit voice, additional and/or alternative options (not illustrated), combinations thereof, and the like. It should be understood that the illustrated options 714, 716, 718 are exemplary only. Additional and/or alternative options are possible and contemplated.

Figure 8:
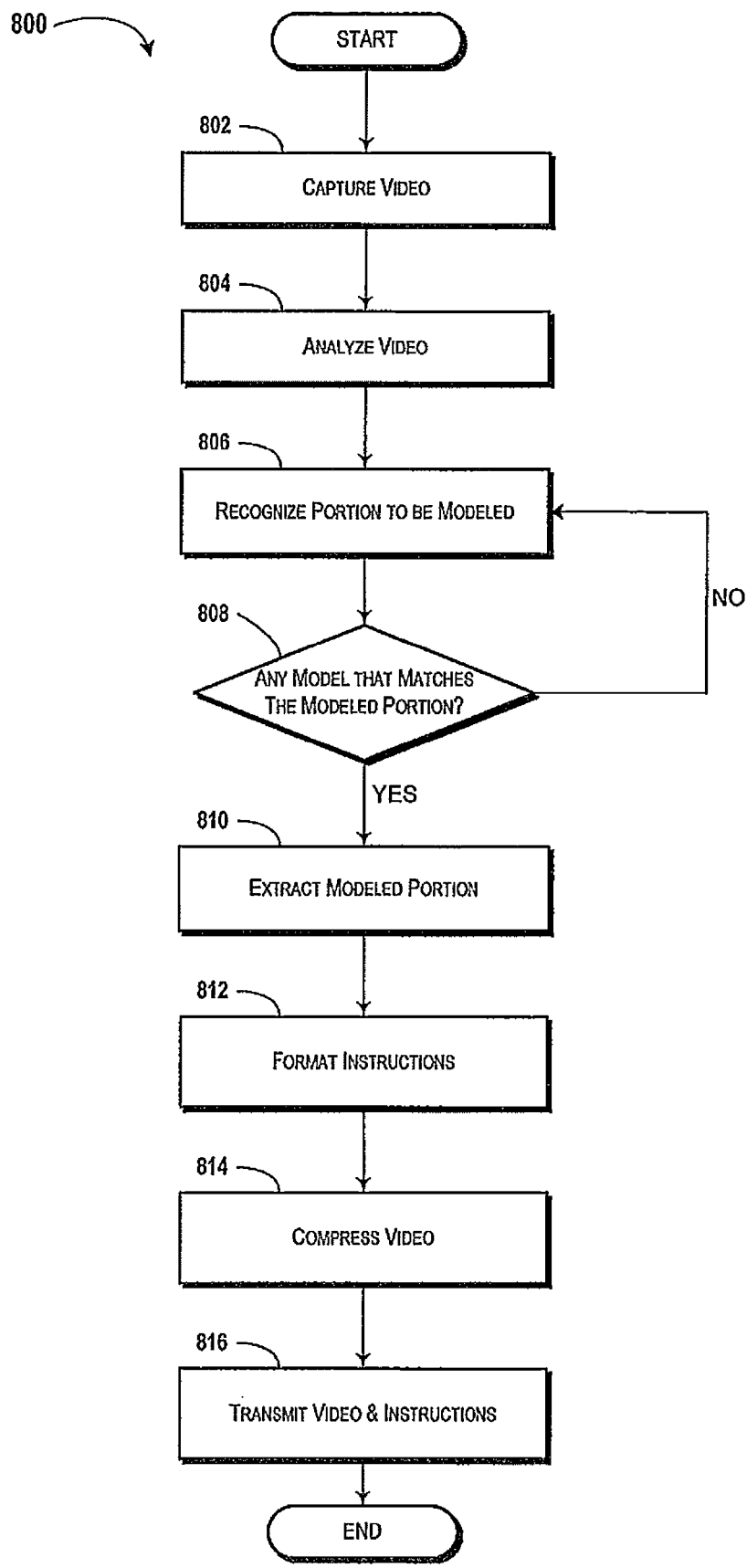
FIG. 8 schematically illustrates a method for performing model-based video fixing at a sending device, according to an exemplary embodiment of the present disclosure.

FIG. 8 schematically illustrates a method 800 for performing model-based video fixing at a sending device, according to an exemplary embodiment of the present disclosure. It should be understood that the steps of the method 800 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 800 can be ended at any time. Some or all steps of this process, and/or substantially equivalent steps, can be performed by execution of computer-readable instructions included on a computer readable medium.

The method 800 begins, and flow proceeds to block 802, wherein video can be captured by a video-capable device such as, for example, the mobile device 108. If the video-capable device is the mobile device 108, then the video can be captured using, for example, the image system 232, the video system 234, the audio I/O 226, combinations thereof, and the like. The video can be captured by the device and passed to a video application for processing.

As illustrated at block 804, the video application can analyze the video to determine if there are any portions of the captured video that may be modeled. The video can be analyzed by instructions stored in a memory that is accessible by the video-capable device, such as, for example, the memory 204 of the mobile device 108. As illustrated at block 806, the video application can recognize a portion of the video to model, as explained above with reference to FIGS. 5A-5D and 6A-6D. Although not illustrated in FIG. 8, it should be understood that if the model-based video fixing application does not recognize any portions of the video to model, the video can be transmitted without modeling any portions of the video.

At block 808, the MBVS 114 can determine if there are any models available that match the portion of the video identified for modeling. For example, if the MBVS 114 determines that an ocean is present in the captured video, the MBVS 114 can search the model library for an ocean model that approximates the ocean in the captured video. Similarly, if the MBVS 114 determines that grass is present in the captured video, the MBVS 114 can search the model library for a grass model that approximates the grass in the captured video. Other models are possible and contemplated, as explained in more detail above with reference to FIGS. 5A-5D and 6A-6D.

If the MBVS 114 finds a model that matches or approximates the identified portion, the method 800 can proceed to block 810, wherein the MBVS 114 can extract the modeled portion from the captured video. If the MBVS 114 does not find a model that matches or approximates the identified portion, the method 800 can return to block 806 to search the video for another portion that may be modeled. Although not illustrated in FIG. 8, the MBVS 114 can be configured to search any number of times for a portion to model. If the MBVS 114 does not find a portion to model, the method 800 can end, or can proceed to the compression and transmission steps described below.

At block 810, the MBVS 114 can extract the portions of the video that have been identified for modeling. As was explained above with reference to FIGS. 5A-5D and 6A-6D, the MBVS 114 can use, for example, a model-based video fixing application to extract the portions of the video that have been identified for modeling. A model-based video fixing application can include instructions that, when executed, search the video for portions of the video that can be modeled without greatly impacting the receiving user's comprehension of the transmitted video. Depending upon the instructions, the model-based video fixing application can search for static portions of the video, portions of the video with no or few color variations, portions of the video with a recognized pattern, or patterns, and the like.

As explained above, the model-based video fixing application can recognize a sky by recognizing a substantially solid-colored region with few variations. Similarly, the model-based video fixing application can recognize that the sky is substantially static and recognize that a modeled sky will have little, if any, impact on a user's comprehension of the transmitted video. Additionally, or alternatively, the model-based video fixing application can recognize various colors, patterns, color patterns, pattern recognitions, and the like, in a transmitted video and use models to approximate these and other visual aspects of the video or video frames.

As illustrated at step 812, the MBVS 114 can format instructions for the receiving device to recreate the modeled video portion. The instructions can include, for example, coordinates that bound a region to be substituted by a modeled scene. Referring to the examples illustrated in FIGS. 5A and 6A, the instructions can indicate that the region bound by the line 504 and 604, respectively, are not included in the transmitted video, and should be modeled with a specified model.

As explained in more detail above, the specified model can include a specific shade, color, and/or pattern to fill the specified region, a specific image or video, combinations thereof, and the like. In the examples illustrated in FIGS. 5A-5D and 6A-6D, the MBVS 114 can specify that the region bound by the lines 504 and 604, respectively, should be replaced with an image or color that approximates the grass and sky, respectively, as shown in FIGS. 5C and 6C, respectively. It should be appreciated that the image does not need to be the same size as the region specified, since the image or video can be tiled, stretched, and or cropped to fit the region.

The instructions can be formatted so that a receiving device can interpret the instructions to generate a substantially correct reproduction of the transmitted video, as will be described in more detail below with reference to FIG. 9. As such, the receiving device can include some or all of the models included at the transmitted device, if desired. As illustrated at block 814, the transmitting device can compress the video. The transmitting device can use, for example, an application, routine, subroutine, program, software, algorithm, CODEC, and the like, to compress or encode the video. At block 816 the video can be transmitted along with instructions. The method 800 can end.

Figure 9:
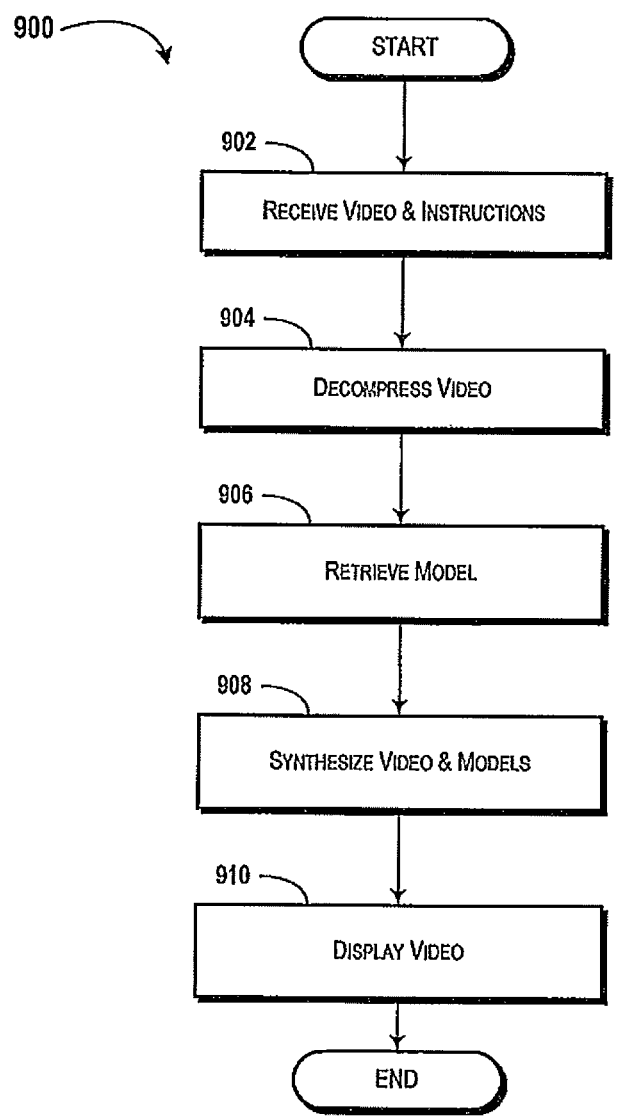
FIG. 9 schematically illustrates a method for performing model-based video fixing at a receiving device, according an exemplary embodiment of the present disclosure.

FIG. 9 schematically illustrates a method 900 for performing model-based video fixing at a receiving device, according to an exemplary embodiment of the present disclosure. It should be understood that the steps of the method 900 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 900 can be ended at any time. Some or all steps of this process, and/or substantially equivalent steps, can be performed by execution of computer-readable instructions included on a computer readable medium.

The method 900 begins, and flow proceeds to block 902, wherein video is received by a receiving device. The video received by the receiving device can include video and instructions, for example, video and instructions such as those described above with reference to FIG. 8. The video can be received by, for example, a mobile device 108, an Internet capable device 110, a communications device 112, or another device with the functionality described herein. The method 900 will be described as performed by a device 108 that has received the video transmitted by another device 108, or an MBVS 114.

At block 904, the device 108 can decompress the received video. The device 108 can decompress the video by applying decompression software, applications, algorithms, CODECS, and the like. At block 906, the device 108 can retrieve the model specified by the instructions received. The device 108 can retrieve the model from a memory such as, for example, the memory 204. Additionally, it should be understood that the model can be sent to the device 108 by the sending device, the MBVS 114, or by another entity of the communications network 100. Additionally, or alternatively, the device 108 can access an external memory such as, for example, a server on the communications network 100 to retrieve the specified model. In some embodiments, the model includes a color or shade designation, so the device 108 may not need to retrieve a model, but may instead fill the designated region with the specified color or shade.

At block 908, the device 108 synthesizes the video and specified models according to the received instructions. As explained above with reference to FIGS. 5A-5D and 6A-6D, the device 108 can use the model to fill the region designated by the instructions. As such, the device 108 can display a video substantially similar to the video captured at the transmitting device, even though a substantial portion of the captured video is not actually transmitted to the receiving device. In other words, at least a portion of the displayed video can be modeled by the transmitting and receiving devices. At block 910, the device displays the video for the user. The method 900 can end.

In some embodiments, the MBVS 114 can make use of location information to perform the functions described herein. For example, the device 108 can use GPS, A-GPS, network triangulation, and/or other location services to determine the location of the device 108. The MBVS 114 can use the location information to validate the model selected for modeling a portion of the video. For example, if the MBVS 114 identifies a beach scene to model a portion of the video, the MBVS 114 can determine if the location information is consistent with this model. If, for example, the video is being captured in the mountains, the MBVS 114 can determine that the model may not be consistent with the location of the device 108. As another example, if the MBVS 114 identifies a grass sample to model a portion of a video captured in the desert, the MBVS 114 can determine that the model may not be consistent with the location of the device 108. The MBVS 114 can prompt the user to validate the selected region, allow the model to be used despite the inconsistency, select an alternative model, transmit the video without modeling, or perform additional functions on the video. Data associated with the location information can be obtained from a node of the communications network 100, stored in a memory 204 of the device 108, and/or stored in a memory 306 of the MBVS 114.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A server residing on a node of a wireless communications network, comprising:
    a processor; and
    a memory containing instructions which, when executed by the processor, cause the processor to perform operations comprising:
        recognizing a portion of video data, received from a first communication device in communication with the wireless communication network, that can be modeled;
        determining a location of a second communication device in communication with wireless communication network to which to transmit the video data;
        determining a model that can be used to represent the portion of the video data that can be modeled, wherein the model that can be used to represent the portion of the video data that can be modeled is determined based on the location of the second communication device;
        extracting the portion of the video data that can be modeled from the video data; and
        formatting instructions identifying the portion of the video data that can be modeled and the model that can be used to represent the portion of the video data that can be modeled.

2. The server of claim 1, wherein the memory further contains instructions which cause the processor to output the video data, the instructions identifying the portion of the video data that can be modeled, and the model that can be used to represent the portion of the video data that can be modeled from the server for transmission to the second communication device.

3. The server of claim 1, wherein the operations further comprise outputting the instructions identifying the portion of the data, for transmission to the second communication device.

4. The server of claim 1, wherein the operations further comprise determining that the model to represent the portion of the video data exists.

5. The server of claim 2, wherein the second communication device retrieves the model identified in the instructions received from the server, synthesizes the video data received and the model to generate a model-based video, and displays the model-based video.

6. The server of claim 1, wherein the model is stored in a storage device associated with the second communication device.

7. The server of claim 1, wherein the model is not stored in a storage device associated with the second communication device.

8. A method, comprising:
    recognizing, at a server residing on a node of a wireless communication network, a portion of video data, received from a first communication device in communication with the wireless communication network, that can be modeled;
    determining, by the server, a location of a second communication device in communication with the wireless communication network to which to transmit the video data;
    determining, at the server, a model that can be used to represent the portion of the video data that can be modeled, wherein the model that can be used to represent the portion of the video data that can be modeled is determined based on the location of the second communication device;
    extracting, at the server, the portion of the video data that can be modeled from the video data; and
    formatting, at the server, instructions identifying the portion of the video data that can be modeled and the model that can be used to represent the portion of the video data that can be modeled.

9. The method of claim 8, further comprising:
    outputting the video data, the instructions identifying the portion of the video data that can be modeled, and the model that can be used to represent the portion of the video data that can be modeled from the server for transmission to the second communication device.

10. The method of claim 8, further comprising: outputting the instructions identifying the portion of the data, for transmission to the second communication device.

11. The method of claim 8, further comprising determining that the model to represent the portion of the video data exists.

12. The method of claim 9, wherein the second communication device retrieves the model identified in the instructions received from the server, synthesizes the model and the video data received to generate a model-based video, and displays the model-based video.

13. The method of claim 8, wherein the model is stored in a storage device associated with the second communication device.

14. The method of claim 8, wherein the model is not stored in a storage device associated with the second communication device.

15. A computer readable storage device comprising computer readable instructions that, when executed by a processor in a server residing on a node of a wireless communication network, cause the processor to perform operations comprising:

recognizing a portion of video data, received from a first communication device in communication with the wireless communication network, that can be modeled;

determining a location of a second communication device in communication with the wireless communication network to which to transmit the video data, wherein a model that can be used to represent the portion of the video data that can be modeled is determined based on the location of the second communication device;

determining a model that can be used to represent the portion of the video data that can be modeled;

extracting the portion of the video data that can be modeled from the video data; and formatting instructions identifying the portion of the video data that can be modeled and the model that can be used to represent the portion of the video data that can be modeled.

16. The computer readable storage device of claim 15, wherein the computer readable instructions further cause the processor to perform:

outputting the video data, the instructions identifying the portion of the video data that can be modeled, and the model that can be used to represent the portion of the video data that can be modeled from the server for transmission to the second communication device.

17. The non-transitory computer-readable storage device of claim 15, wherein the operations further comprise outputting the instructions identifying the portion of the data, for transmission to the second communication device.

18. The computer-readable storage device of claim 15, wherein the operations further comprise determining that the model to represent the portion of the video data exists.

19. The computer readable storage device of claim 16, wherein the second communication device retrieves the model identified in the instructions received from the server, synthesizes the model and the video data received to generate a model-based video, and displays the model-based video.

20. The computer readable storage device of claim 15, wherein the model is stored in a storage device associated with the second communication device.

* * * * *